(12) United States Patent
Hamburg

(10) Patent No.: US 8,438,098 B2
(45) Date of Patent: May 7, 2013

(54) METHOD FOR FUNDING A CHARITY USING A PREPAID CARD

(75) Inventor: Jonathon Hamburg, Oakville (CA)

(73) Assignees: Jonathon Hamburg, Oakville (CA); David Eason, Toronto (CA)

( * ) Notice: Subject to any disclaimer, the term of this patent is extended or adjusted under 35 U.S.C. 154(b) by 0 days.

(21) Appl. No.: 12/258,598

(22) Filed: Oct. 27, 2008

(65) Prior Publication Data

US 2009/0112762 A1 Apr. 30, 2009

Related U.S. Application Data

(60) Provisional application No. 60/982,441, filed on Oct. 25, 2007.

(51) Int. Cl.
*G06Q 40/00* (2012.01)

(52) U.S. Cl.
USPC ............ 705/37; 705/35; 705/36 R; 705/38

(58) Field of Classification Search .......... 705/37–38, 705/39–43; 235/379–381
See application file for complete search history.

(56) References Cited

U.S. PATENT DOCUMENTS

| | | | | |
|---|---|---|---|---|
| 6,021,397 A | * | 2/2000 | Jones et al. .............. | 705/36 R |
| 6,092,052 A | * | 7/2000 | Ziarno .................... | 705/21 |
| 6,467,684 B2 | | 10/2002 | Fite et al. | |
| 7,050,554 B2 | | 5/2006 | Parfait et al. | |
| 7,219,071 B2 | * | 5/2007 | Gallagher ............... | 705/14.14 |
| 2001/0042785 A1 | * | 11/2001 | Walker et al. ........... | 235/379 |
| 2002/0046341 A1 | * | 4/2002 | Kazaks et al. .......... | 713/182 |
| 2002/0082969 A1 | * | 6/2002 | O'Keeffe et al. ....... | 705/37 |
| 2003/0028483 A1 | * | 2/2003 | Sanders et al. .......... | 705/40 |
| 2004/0117302 A1 | * | 6/2004 | Weichert et al. ........ | 705/40 |
| 2004/0182922 A1 | | 9/2004 | Talarico, Jr. | |
| 2004/0205023 A1 | * | 10/2004 | Hafer et al. ............. | 705/43 |
| 2004/0249752 A1 | | 12/2004 | Prato et al. | |
| 2006/0259424 A1 | | 11/2006 | Turcotte et al. | |
| 2007/0063020 A1 | * | 3/2007 | Barrafato ................ | 235/380 |
| 2007/0083437 A1 | * | 4/2007 | Hamor .................... | 705/26 |
| 2008/0116258 A1 | * | 5/2008 | Kane ....................... | 235/380 |

OTHER PUBLICATIONS

Front Page 2—No Title: Assembly., New York Times (1857-1922); Apr. 16, 1860; ProQuest Historical Newspapers: The New York Times (1851-2009) p. 1.*

* cited by examiner

*Primary Examiner* — Alexander Kalinowski
*Assistant Examiner* — Clement B Graham
(74) *Attorney, Agent, or Firm* — Ridout & Maybee LLP; Charles Boulakia

(57) ABSTRACT

A method of charity funding, using prepaid cards. A winner of a charity lottery is provided with a prepaid card having, as an initial balance, the lottery winnings. As part of the card activation process, the winner is asked whether they would like to donate all or part of their winnings back to the charity. Systems and methods for providing same.

14 Claims, 3 Drawing Sheets

METHOD FOR FUNDING A CHARITY USING A PREPAID CARD

CROSS-REFERENCE TO RELATED APPLICATION

This application claims the benefit of the filing date of U.S. Provisional Patent Application No. 60/982,441 filed Oct. 25, 2007 under the title METHOD FOR FUNDING A CHARITY USING A PREPAID CARD The content of the above patent application is hereby expressly incorporated by reference into the detailed description hereof.

FIELD OF THE INVENTION

The invention relates to a method of charity funding, utilizing prepaid cards as a payout for charity lottery winnings.

BACKGROUND OF THE INVENTION

Prepaid Cards

Prepaid cards for making purchases are known in the art. A prepaid card is any form of card that has a positive balance, which can be used to make purchases.

Typical card systems, such as a standard Mastercard™, VISA™ or American Express™ card are credit cards, wherein the user of the card is given a credit limit, and is able to use the card at a variety of different merchants that accept the card, to purchase goods or services up to the credit limit amount. The user of the card is then required to pay back this amount (typically, plus charges or interest) to the company that issue the credit card, rather than to the merchant. The merchant is typically paid by the credit card issuer.

Credit cards have a wide variety of designs and limitations. At one end of the range, they can work in an extremely limited manner (at one merchant, for one transaction, or to a specific maximum credit limit); at the other end of the range, they can be quite broad (thousands of different merchants, unlimited transactions, unlimited credit).

Prepaid cards work with much the same flexibility as credit cards, and are well known in the art. Prepaid cards are issued, for example, by the same major card issuers such as Mastercard™ or VISA™ but have a "positive" balance. For example, a person without a credit history and desirous of having a credit card can instead obtain a prepaid card, by paying, in advance, a sum to the prepaid card issuer. The card can only be used up to a maximum of that sum. A person with a poor credit rating, or wishing to avoid credit cards, can deposit, for example, $1000 into a prepaid card account, and is then able to purchase up to $1000 on that prepaid card. The cards can be of one time use (used for a specific purpose, or a specific task/purchase), but are more typically of a declining balance, where the card can be used until the balance is $0. In many cases, the cards can be "filled up" by the user, by adding money to the balance, either by going in to a retail facility which allows such "fill ups", or electronically by linking the card to a bank account or wire payment.

Visa™, MasterCard™, Discover™, and American Express™ open-system, stored-value, prepaid gift cards are marketed today to consumers through a variety of channels. Typically, companies purchase such gift cards in bulk for distribution to their employees or customers as incentives, awards, or customer loyalty benefits.

Charity Cards

There are known examples of prepaid cards for making purchases and donations to charities. For example, U.S. Pat. No. 6,467,684 describes a prepaid card for purchases, for one-time use, wherein the remaining cash value of the prepaid card after the one-time purchase is credited to a charity. U.S. Pat. No. 6,088,682 describes a donor card wherein, when a user purchases goods for cash, they also present the donor card, and, in lieu of change for their purchase, the change is donated to the charity indicated on the donor card.

U.S. Pat. No. 5,466,919 links a debit or credit card to one or more charities, wherein when the card is used to make a purchase, a percentage of the purchase price is added to the transaction and donated to the linked charity. A similar prepaid card is described in US patent publication 2004/0182922.

US patent publication 2997/0063020 describes a form of "charity gift card". The card is purchased by an individual, who, and gives it as a gift to a recipient. The recipient can then use it as if it was a prepaid card, but to donate to one or more selected charities.

In addition, scrip cards, sold by charities at a premium, or purchased by charities at a discount and sold at face value, are also known, and described in US patent publication 2004/0249752.

Charity Fundraising

An increasingly popular form of fundraising for charitable or not-for-profit organizations is the charity lottery. In a typical charity lottery, individuals purchase tickets or coupons, which provide the individual with a chance to win prizes. The tickets or coupons, of course, are optional, and have been replaced of late with internet registration, for example, wherein an individual purchases a "ticket", or, rather, an opportunity to win the prizes, online, with no actual physical ticket distributed.

Prizes for charity lotteries can be of any size or form, but are increasingly often in the form of cash, automobiles, or houses. In many instances, where the prize is a non-monetary prize, the winner has the option of receiving the value of the prize, or a significant portion of the value of the prize, in cash. Typically, if the prize is to be given in cash, a cheque from the charity to the winner is issued.

It would be desirable to have a method of providing cash to a winner of a charity lottery in a cost-effective, easy to use manner, such as a prepaid card. It would also be desirable to have a method of automatically targeting a charity winner for a donation back to the charity.

SUMMARY OF THE INVENTION

According to one embodiment of the invention is taught a method for providing funding to a charity, said method comprising: (a) issuing a prepaid card to a winner of a charity auction, said prepaid card having a card balance corresponding to a prize won by said winner; (b) providing a card activation process, whereby said prepaid card is activated by said winner, prior to use of said card; wherein said card activation process comprises the following steps: (i) a winner validation step, wherein the identity of said winner is confirmed; (ii) a charity donation step, wherein the winner is asked to donate to said charity; (iii) a card activation step, wherein the card is activated.

According to one aspect of the invention, the card activation process further comprises a prize validation step, wherein the value of said prize is confirmed.

According to a further aspect of the invention, the charity donation step further comprises a charity inquiry, whereby the winner is asked whether they wish to donate back some or all of said prize to said charity.

According to a further aspect of the invention, if the winner responds positively to said charity inquiry, said charity donation step further comprises: (a) an amount inquiry, whereby said winner selects an amount to be donated; and (b) a card deduction, whereby said amount to be donated is subtracted from said card balance.

According to a further aspect of the invention, the charity donation step further comprises an automated receipt generator, whereby a charitable receipt is generated and sent to said winner.

In a further embodiment of the present invention is a system for enabling donations, comprising at least one processor, at least one data storage device electronically coupled to the at least one processor, the at least one data storage device storing at least one identity parameter and a prize amount, both said at least one identity parameter and said prize amount being associated with a first entity; the at least one processor operable to receive, from said first entity, a validation request comprising a selection of one or more identity parameters, and confirm an identity of said first entity from said identity parameters; the at least one processor operable to request, from said first entity, a donation, further comprising a donation amount; the at least one processor operable to deduct said donation amount from said prize amount.

According to a further aspect, the processor is further operable to store information associated with said donation and donation amount, and issue a receipt to said first entity for said donation amount.

According to a further aspect, the processor is further operable to activate a card associated with said first entity.

According to a further aspect, the validation request is received telephonically.

According to yet another aspect of the invention, the processor is electronically coupled to a telecommunications network, wherein the validation request is implemented utilizing an interactive voice recording system coupled to said processor and said network.

According to yet a further aspect of the invention, the validation request is initiated by one or more calls from a telecommunication device utilized by said first entity seeking to validate a card.

A further embodiment of the present invention is a method for enabling donations to a charity, comprising (a) providing an inactive card to a first entity; (b) receiving information associated with said first entity from the charity; (c) receiving a prize value associated with said card from the charity; (d) receiving an activation request from said first entity; (e) confirming an identity of said first entity by requesting identity data from said first entity, receiving said identity data from said first entity, and comparing said identity data with said information associated with said first entity; (f) asking said first entity whether they wish to provide a donation to said charity; (g) receiving a response to (f) from said first entity, and, if said response is affirmative, asking said first entity for a donation amount; (h) deducting said donation amount from said prize value; and (i) activating said card.

According to an aspect of the invention, the method further comprises the step of issuing a charitable receipt to said first entity for said donation amount.

According to a further aspect of the invention, the information associated with said first entity, prize value, identity data, and donation amount are stored on at least one data storage device electronically coupled to a processor.

According to a further aspect of the invention, at least one of steps (d), (e), (f), and (g) utilize an interactive voice recording system.

According to a further aspect of the invention, the activation request is initiated by one or more calls from a telecommunication device utilized by said first entity.

DETAILED DESCRIPTION

Figure 1:
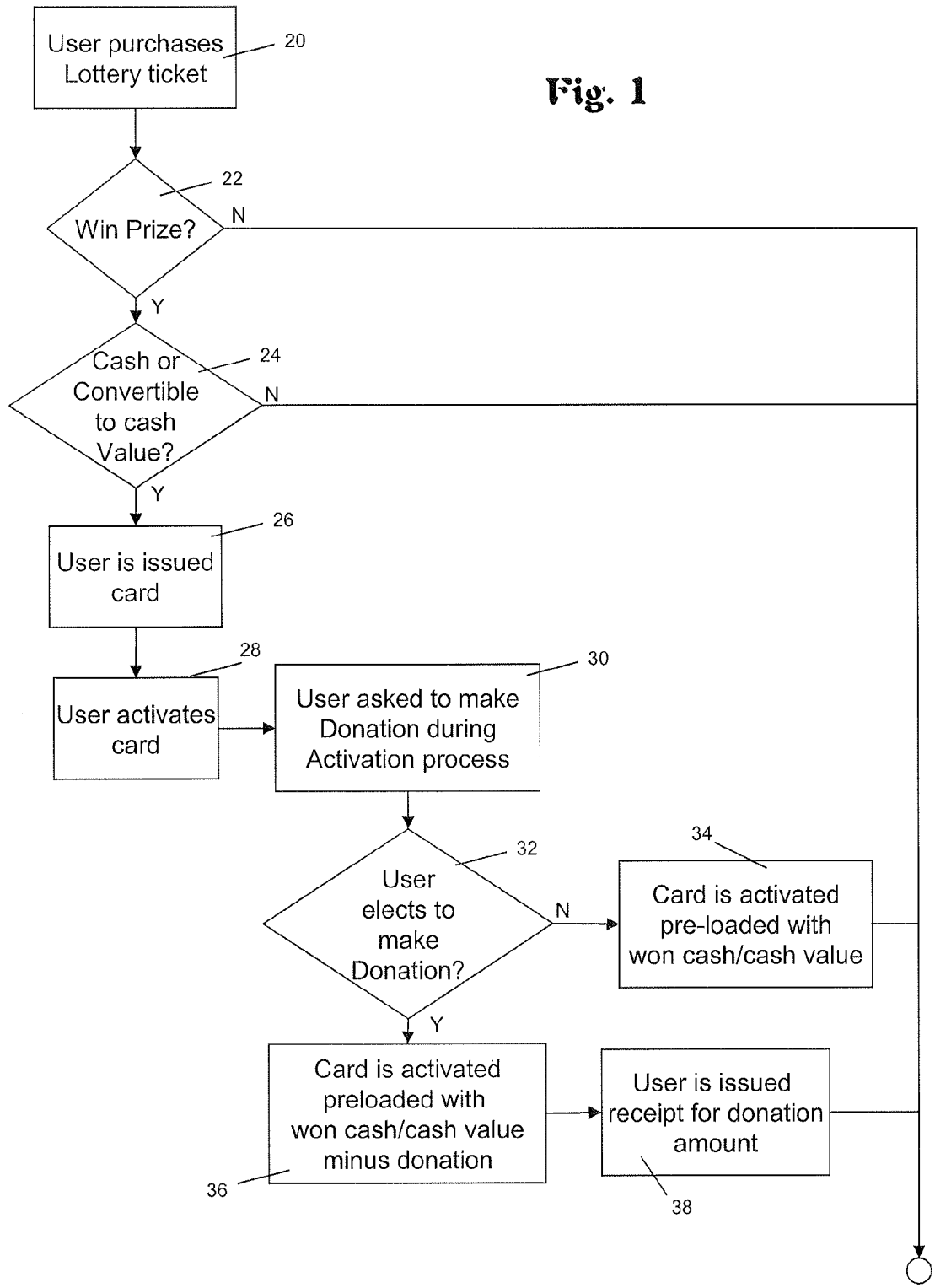
FIG. 1 shows a flow chart depicting an embodiment of the present invention.

The Invention pertains to a charity lottery, having one or more winner of a cash prize, or a prize having a cash value. In a charity lottery, individuals purchase lottery tickets, or chances to win a prize. Often, the prize is a cash prize; typically, a cheque is issued to a prize winner. In the present invention, once a winner of a prize is identified or chosen, instead of issuing a cheque, the prize winner is provided a prepaid card having a card balance corresponding to the prize won.

The prepaid card can be pre-activated, or can be an unactivated card that requires the prize winner to activate the card before it can be used.

The prepaid card may be a store-specific card, or, more preferably, can be a card that can be used at a wide variety of stores, and to purchase a wide variety of goods and services. For example, the card may be a prepaid Mastercard™, American Express™ card, VISA™ card, or Discover™ card. The card is prepaid in that it is "preloaded" with the prize amount. Alternatively, the prize amount is added to the card balance upon activation of the card by the winner.

Activation of cards can be done in person, in instances where the card is hand delivered, or provided to the winner at the charity draw. Activation of cards can also be done in person, by the prize winner, in instances where the card is mailed or shipped to the prize winner. Activation of cards in this manner can take place at a defined location, such as the charity's offices, for example, during business hours. However, since charity lotteries are often national, and prize winners are often located far away from the charity's offices, there is an advantage to shipping or mailing the cards to the winner, and having the winner activate the card remotely. Card activation prevents fraud in that cards lost in the mail, or waylaid, or reaching anyone other than the designated recipient (i.e. the prize winner) are difficult to use, since they need to be activated, using information typically only available to the prize winner.

Remote activation of cards is well known in the art. Often, a card will have a sticker on it that identifies a toll free telephone number that needs to be called to activate the card. In many cases, a separate mailing, having a personal identification number but not containing the card, is sent. A person wishing to activate the card would call the toll free number, and be presented with a live operator, or, increasingly, an interactive voice recording system (IVR), which, through a series of prompts, would allow said person to identify themselves (for example, by entry of the personal identification number on the keypad, some other form of identification, or by confirming the telephone number of the person through a call display system). IVRs are known in the art, both utilizing touch tone data entry and voice recognition.

In another embodiment, the activation of the card can occur through an internet site, which prompts for the same or similar information, and activates the card.

A unique feature of the invention is that, as part of the activation process, the prize winner is "given the opportunity" to donate to the charity. Since the prize winner must, in certain embodiments, activate the card in order to spend their winnings, the prize winner is a captive audience—they must, at the very least, consider whether they wish that a part of their winnings to be donated back to the charity. The prize winner, at the moment of activating their card, is typically in the perfect mood and cognitive state for solicitation of a charitable donation: the prize winner has suddenly and unexpectedly received a windfall of cash, and is feeling generally favorable towards the specific charity making the request, since they have just won money from the charity. In addition, the prize winner is, by default, a previous donator to the charity, since they have (at the very least) purchased a lottery ticket from the charity. It is thus expected that a larger percentage of prize winners will donate some of their winnings back to the charity if they are prompted to do so upon card activation.

One embodiment of the invention is the process exemplified in the flow chart of FIG. 1. A plurality of users purchase one or more lottery ticket(s) (20). Each of these tickets has a chance of winning a prize. The lottery tickets are checked to determine whether a prize is won (22). As is the nature of a lottery, many of these tickets do not win a prize, in which case the ticket has no value, and the flow chart ends. If a prize is won, the system determines whether the prize is a cash prize or a prize that is convertible to a cash prize (24). If the prize is not a cash prize, the flow chart ends, and the user is given their non-cash prize (such as an automobile or a home) in a different process. If the prize is a cash prize, or a prize that is convertible to a cash value and the user elects to receive the cash value (process not shown), the user is issued a prepaid card (26). The user activates the card (28).

The card activation can be done in person, for example, if a charity auction is at a charity event at which the user is attending, and the draw for the auction winner is at the event, the winner can obtain, and activate, the card by meeting with a lottery representative, who validates or checks the ticket, issues the card (26), and asks the user to make a donation (30) (and optionally activates or fills out forms to activate the card and load the card with the cash value (34, 36). The lottery representative may also issue a receipt for the donation amount (38) if and when appropriate.

In a preferred embodiment, however, the winner of the lottery is determined (not shown), and that user is issued a card (26) with a card number, and, optionally, their name, pre-printed on it. The card is shipped to the user (not shown), who then activates the card (28) using an automated or semi-automated process. For example, the user can activate the card (28) by calling a telephone number, or going to a web site. The activation process can be done through a "live" lottery representative at the other end of the telephone, or communicating through the website, or, more preferably, can be automated or partially automated, using an automated web form or an IVR. During the card activation process (28), the user is asked whether they would like to make a donation of all or part of their winnings back to the charity (30). If the user elects not to make a donation in the donation query (32), the card is activated, preloaded with the total amount of the cash prize or the cash value (34). If the user elects to make a donation (32), the user is asked the value of the donation (not shown) and the card is activated, preloaded with the total amount of the cash prize or the cash value, minus the donation amount (36). If the user has elected to make a donation, optionally, the system will also automatically generate a receipt for the donation amount (38), and send the receipt, which may be a tax deductible charitable receipt, to the user.

Figure 2:
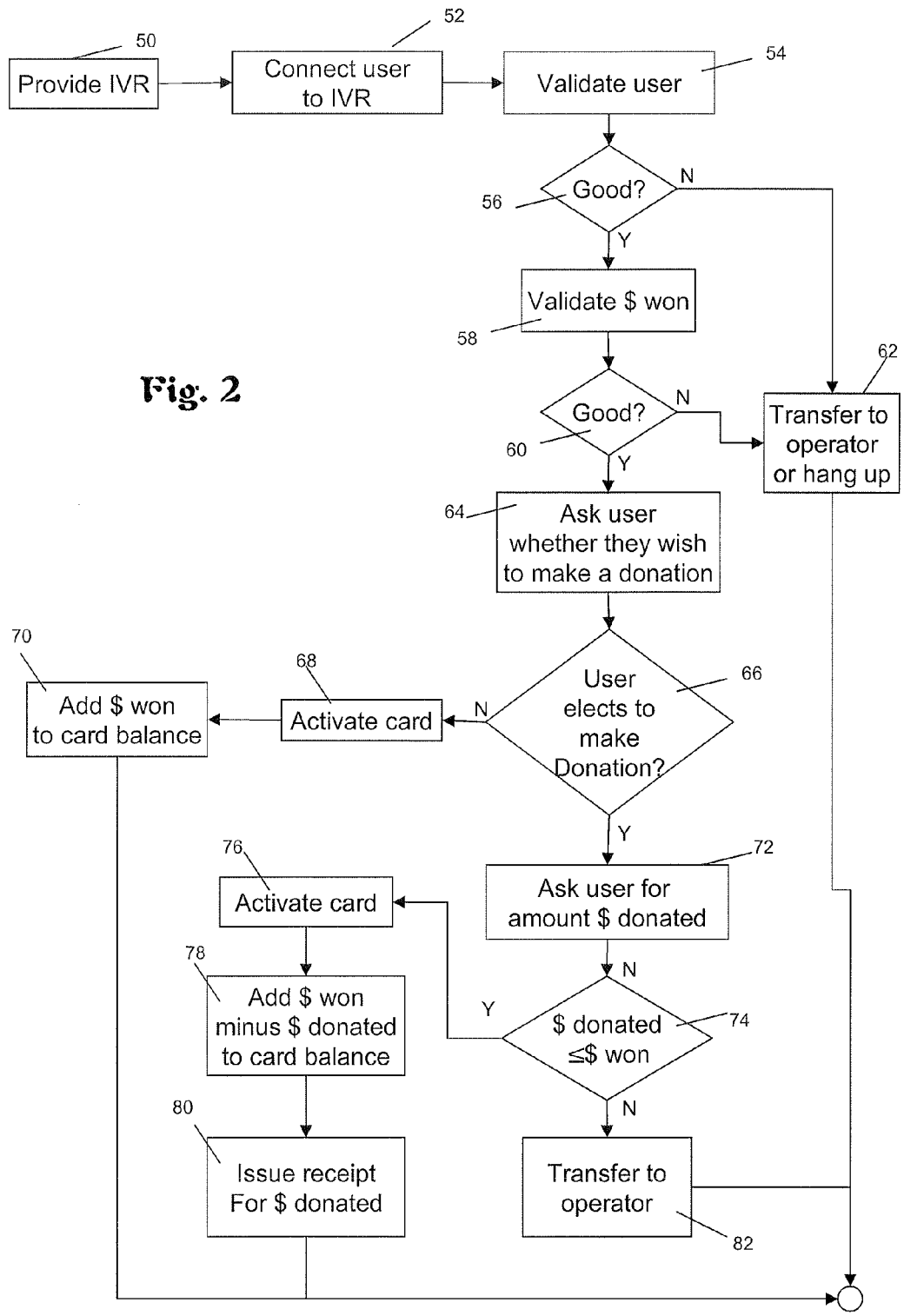
FIG. 2 shows a flow chart depicting an embodiment of the present invention.

The card activation process is shown in more detail, in a second embodiment of the invention, in FIG. 2.

Here, an IVR (50) is provided, and a user connects to the IVR (52), through known means. For example, the user may call a toll free number to get through to the IVR. The IVR validates the user (54), determining the identity of the user, through known means, for example, by asking the user for the answer to a question, such as their mother's maiden name, by asking the user to enter a pre-selected or pre-assigned personal identification number, or some other means. Of course, the IVR would be connected to a data storage unit (not shown), for near instantaneous comparison of the user's response to a known correct response, which would be stored on the data storage unit. If the system is unable to validate the user, the user may be transferred to an operator (62), or, alternatively, the user would be informed that the system could not identify them, and would be either invited to try again, or to call back with the appropriate information.

User validation may also result in ticket validation, if the name of the consumer is tied to a specific ticket. For example, the data storage unit may contain information as to the identities of winning users, rather than information as to the identities of winning tickets. This would be appropriate in the case of an internet-purchased ticket, or a ticket wherein the user pre-registered their information. In these embodiments, validation of the user would also allow the system to determine whether that user has won a prize, and the prize amount. Thus, in this embodiment, validation of the ticket (58, 60) is not necessary, as it is done automatically by the system as a part of user validation (54).

In other embodiments, a user may have purchased a ticket anonymously, for example, by paying for, and receiving a ticket at a ticket booth or lottery terminal. In these embodiments, once a consumer has been validated, the IVR will prompt for validation of the winning ticket (58). The consumer will enter the unique ticket number, or will validate the ticket in some other, pre-determined manner, such as scratching off a code region on the ticket and entering that code. The system then accesses the data storage unit (not shown) to compare the code or ticket number to a list of winning tickets. If the system is unable to validate the ticket as a winning ticket, the consumer may be transferred to an operator (62). Alternatively, the system may prompt the consumer to "try again", or may simply inform the consumer that the system could not validate the winning amount and hang up.

In certain embodiments, the user may not know whether they have won or not when they call. In these cases, the ticket validation (58) or user validation (54) may also be the method in which the user is informed that they have won a prize. In these cases, a further step (not shown) may include informing the user that they have won a prize, or informing the user that they have not won a prize.

In other embodiments, the user already knows whether they have won a prize when they call, either by being informed.

The IVR system will then prompt the user whether they wish to make a donation of a portion of their winnings back to the charity (66). If the user responds in the negative, the system activates the card (68) by known means, for example a check-bit validation sent back to the data storage unit, or an electronic signal or message sent to the card issuer. The system also confirms the balance of the card, either by adding the winning amount to the prepaid card balance (70), or, in cases where the card already contains the winning amount as its balance, confirming that amount. It is also possible to envisage embodiments where the addition of the amount won to the card balance (70), or the confirmation of the winning amount, is not necessary.

If the user responds in the positive, the IVR will prompt the user to enter a donation amount (72). The user may, for example, be prompted to enter an amount directly into the phone keypad. Alternatively, the user may be given a choice among several possible donation amounts. For example, the IVR may ask "for a donation of $100, press 1, for a donation of $250, press 2" etc.

Part of the ticket validation (58) may also, preferably, include having the IVR system access the prize amount. This way, before asking the user whether they wish to make a donation (64), the system would know the amount the user has won, and could present the user with an appropriate automated message. For example, for a $100 winner, the system could prompt or suggest to the user to donate $20 when asking the user for the amount donated (72). For a $10,000 winner, the system would typically prompt or suggest to the user a larger amount, for example, $1,000.

In certain embodiments, for example, where the user is permitted to enter any amount in the keypad as the donation amount, it may be important to ensure that the amount donated does not exceed the amount won in the lottery by the user. Thus the system would compare the amount donated to the amount won (74). In one (shown) embodiment, if the amount donated is larger than the amount won, the user would be transferred to an operator (82), so that a payment method could be determined (since the prepaid card would not cover the donated amount). Other possible embodiments include the IVR system automatically requesting a payment method, or the system refusing amounts that are larger than the amount won by the user.

If the amount to be donated is lower than the amount won, the system can automatically decrease the balance of the prepaid card (containing the winning amount) by the amount donated (78). As discussed above, the system can also activate the card (76). Where an amount is donated, the system may also optionally prepare, issue and send a receipt (80) for the donation amount. The receipt may be a tax deductible receipt in jurisdictions which allow it, and the issuance of the receipt may also include automatically informing taxation authorities of the donation amount and the identity of the user, where appropriate (not shown).

In the embodiment described in FIG. 2, the card may be sent to the user after the activation of the card, for example, in an automated manner, after the user has been taken through the process described in that figure. Alternatively, the user may have already been issued the card before going through the process described. In some embodiments, the card may be the lottery ticket.

Although an IVR system is shown in the examples provided, it would be clear to a person skilled in the art that other systems that allow user input and system access to a data storage system could be utilized. For example, the process shown in FIG. 2 could all be done on-line, using an internet web-page, rather than an IVR.

Figure 3:
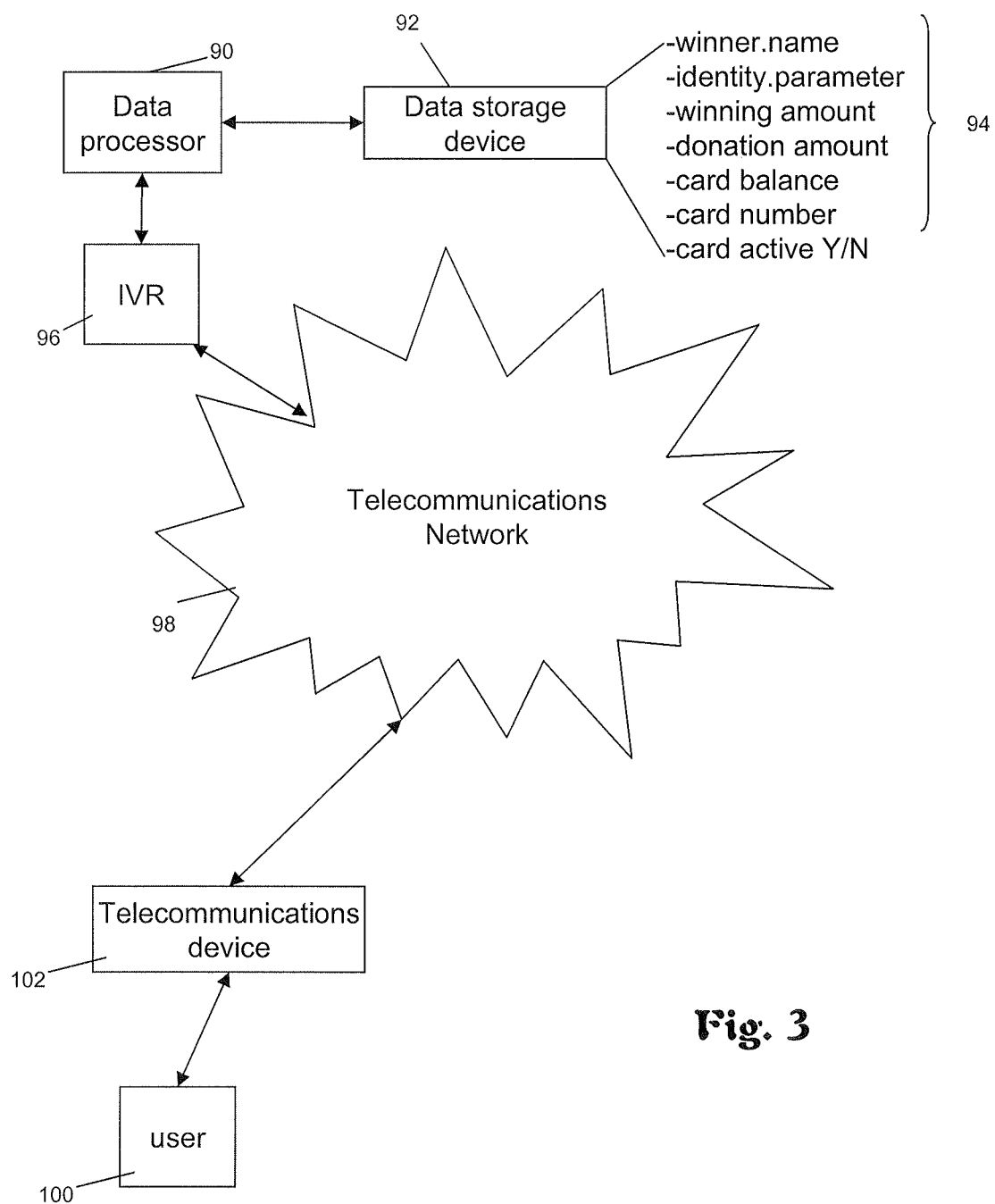
FIG. 3 shows a system that can be used to provide the present invention.

An example of a system able to provide the method of the invention can be found in FIG. 3. A data processor (90) is operably connected to a data storage device (92). The data storage device contains data fields containing data (94), as shown including information necessary to validate a winning user (as shown, the user (winner) name and an identity parameter, though other information could be used depending on the design of the charitable lottery), a field identifying the prize amount, a field for the donation amount, a field for the prepaid card balance, the card number, and whether the card is active.

The data processor (90) is also operably connected to an IVR (96), which is in turn connected to a telecommunications network (98), such as the telephone network. A user (100), wishing to activate their card, would also connect to the telecommunications network, through the use of a telecommunications device (102) such as a telephone or a mobile phone. In an alternative embodiment (not shown), the IVR (96), telecommunications network (98), and telecommunications device (102) can be replaced with a website, the internet, and a computer, respectively.

A user would go through the validation and donation procedure, such as the one shown in FIG. 2, utilizing the system of FIG. 3. The data processor (90) would update the data (94) in the data storage device (92) wherever appropriate. For example, where a user has entered a donation amount (74), that donation amount is entered in the "donation amount" field. The card balance is also updated to reflect the "winning amount" minus the "donation amount". Of course, certain fields, such as the winning amount, the winner name, and the identity parameter, would be pre-input into the data storage device, for example, by the charitable institution, or by the card issuer.

Once the card is activated, it can be used like any prepaid card.

The above examples are meant to illustrate certain embodiments of the present invention, and are non-limiting as to the scope of the invention. All cited references are incorporated herein by reference.

The invention claimed is:

1. A method for providing funding to a charity on a server, said method comprising:
   receiving, at the server, a request to activate a prepaid card, said prepaid card issued to a winner of a charity lottery and having a card balance corresponding to a prize won by said winner of said charity lottery;
   receiving, at the server, a validation request including identity data;
   validating, at the server, the received identity data with stored winner information;
   sending, from the server, a donation request to said winner, said donation request comprising a request to donate a portion or all of said card balance;
   receiving, at the server, a donation response from said winner;
   after receiving the donation response, activating the prepaid card in a card database; and
   if said donation response is affirmative, deducting, at the server, a donation amount from the card balance and transferring at least a portion of said donation amount to said charity.

2. The method of claim 1 further comprising validating the value of said prize.

3. The method of claim 1 wherein when the donation response is affirmative, the method further comprising:
   sending an amount inquiry;
   receiving, in response to the amount inquiry, the donation amount.

4. The method of claim 1 further comprising:
   generating a charitable receipt; and
   sending the charitable receipt to said winner.

5. A system for enabling donations, comprising
   at least one processor;
   at least one data storage device electronically coupled to the at least one processor, the at least one data storage device storing at least one identity parameter and a prize amount, both said at least one identity parameter and said prize amount being associated with an entity, said prize amount corresponding to a prize won by said entity in a lottery;

the at least one processor configured to receive, from said entity, a validation request comprising a selection of one or more identity parameters, and confirm an identity of said entity from said identity parameters;

the at least one processor configured to request, from said entity, a donation, further comprising a donation amount;

the at least one processor configured to deduct said donation amount from said prize amount;

the at least one processor configured to activate a card associated with said entity, with the deducted prize amount after receiving a response to the donation request; and the at least one processor configured to transfer at least a portion of the donation amount to a donation recipient.

6. The system of claim 5, wherein said processor is further configured to store information associated with said donation and donation amount, and issue a receipt to said entity for said donation amount.

7. The system of claim 5, wherein said validation request is received telephonically.

8. The system of claim 7, wherein the processor is electronically coupled to a telecommunications network, wherein the validation request is implemented utilizing an interactive voice recording system coupled to said processor and said network.

9. The system of claim 8, wherein the validation request is initiated by one or more calls from a telecommunication device utilized by said entity seeking to validate a card.

10. A method for enabling donations to a charity on a server, comprising:

receiving from the charity information associated with an entity, said entity provided with an inactive card;

receiving a prize value associated with said card from the charity, said prize value corresponding to a prize won by said entity in a charity lottery;

receiving an activation request from said entity;

confirming, on the server, an identity of said entity by sending a request for identity data from said entity, receiving said identity data from said entity, and comparing said identity data with said information associated with said entity;

sending a request to provide a donation to said charity;

receiving a donation response to from said entity, and, when said response is affirmative, sending a request for a donation amount, and deducting a received donation amount from said prize value associated with said card;

after receiving the donation response, activating said card in a card database on the server, and storing said prize value and information associated with said entity in said card database; and transferring at least a portion of the donation amount to the charity.

11. The method of claim 10 further comprising generating a charitable receipt to said entity for said donation amount.

12. The method of claim 10 wherein said information associated with said entity, prize value, identity data, and donation amount are stored on at least one data storage device electronically coupled to a processor.

13. The method of claim 10 wherein at least one of receiving the activation request, confirming the identity, sending the donation request and receiving the donation response utilize an interactive voice recording system.

14. The method of claim 10 wherein the activation request is received from a telecommunication device utilized by said entity.

* * * * *